C. HYLAND.
MOTOR VEHICLE FOR ROADS OR RAILS.
APPLICATION FILED SEPT. 18, 1919.

1,322,903. Patented Nov. 25, 1919.

INVENTOR;
Charles Hyland
By Wm Wallace White
ATTY.

UNITED STATES PATENT OFFICE.

CHARLES HYLAND, OF ST. ALBANS, ENGLAND.

MOTOR-VEHICLE FOR ROADS OR RAILS.

1,322,903.    Specification of Letters Patent.    Patented Nov. 25, 1919.

Application filed September 18, 1919. Serial No. 324,587.

*To all whom it may concern:*

Be it known that I, CHARLES HYLAND, a subject of the King of Great Britain and Ireland, residing at Woodlands, London Road, St. Albans, in the county of Hertford, England, have invented new and useful Improvements in Motor-Vehicles for Roads or Rails, of which the following is a specification.

My invention relates to motor vehicles for road or rail, and more particularly to such as are actuated or propelled by power driven aerial propellers, turbines or similar devices (which are sometimes mounted in open ended casings attached to the exterior of the vehicle) and not by the usual power driven road or rail wheels, and my invention consists in an improved and simplified construction of such vehicles in which the chassis and/or the body of the vehicle is formed as an open ended tubular duct in which propellers are mounted, the said duct being either of uniform or variable contour in cross section throughout its length but as far as possible of uniform cross sectional area.

My invention will be better understood on reference to the accompanying sheet of drawings, in which:—

The same letters refer to similar parts throughout the several views.

Figure 1:
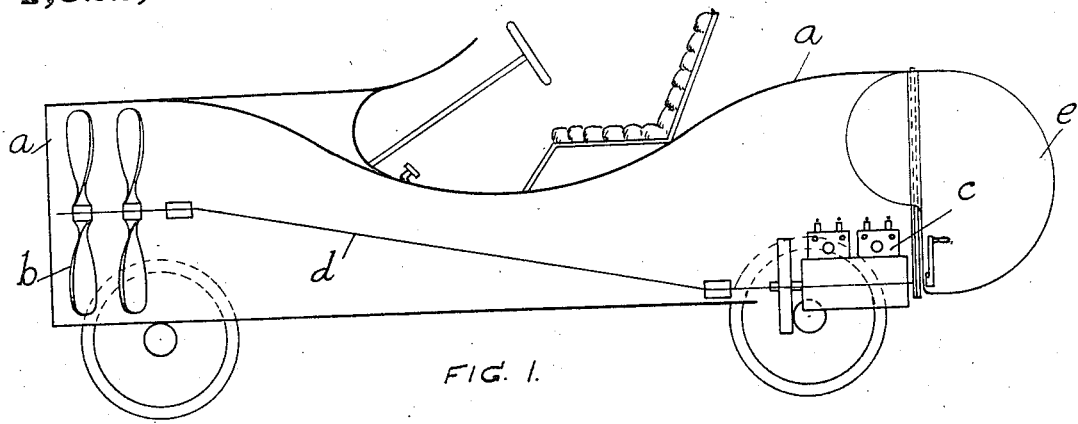
Figure 1 is a diagrammatic sketch showing in sectional side elevation, a motor constructed according to my invention.
Figure 3:
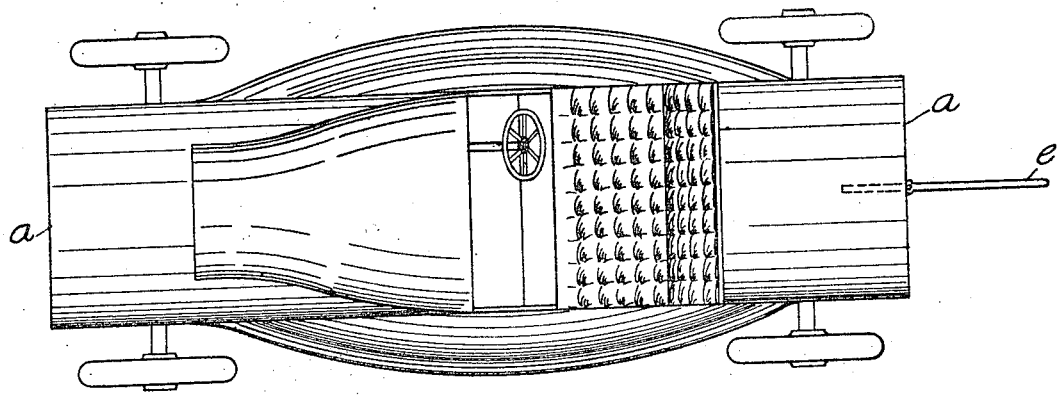
Fig. 3 is a plan view of same.
Figure 2:
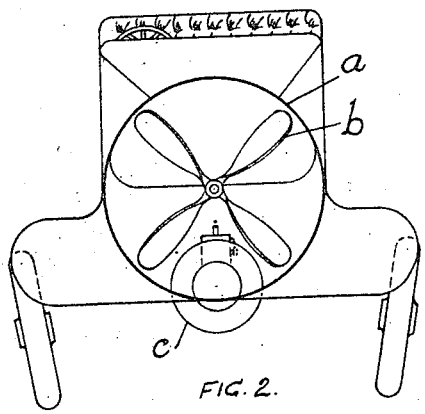
Fig. 2 is a front elevation.

According to my invention I form the chassis or frame as, or incorporate with the chassis or frame of a mechanically propelled vehicle, an open-ended tubular duct $a$ of any suitable form through which air may pass freely. Within this tubular duct $a$ is mounted any number of air propellers, turbines or similar devices $b$ driven by a fluid pressure or other form of motor $c$ or from any other suitable source of power. The bearing or housing within which the propeller shaft $d$ revolves may be secured either within the tubular duct $a$ or to some other convenient part of the vehicle.

The fluid pressure or other form of motor $c$ is situated either within the tubular duct $a$ or exteriorly thereto or it may be partly within the duct and partly outside of it, and is connected to the propeller or propellers $b$ by suitable transmission devices which may include variable speed gears and clutch mechanism.

The contour of the cross section of the tubular duct $a$ may vary considerably throughout its length, as for example the duct may be so constructed as to form the body of the vehicle or a portion thereof, or it may be adapted to form or receive the seating accommodation, (as shown in the drawings) but whatever shape the duct may assume, it must always permit of air passing freely through it, and as far as possible the vertical sectional area is maintained uniform throughout the whole length. In this connection it may be mentioned that the chief function of the tubular duct is to provide a relatively clear passageway for the currents of air induced by the rotation of the propeller, so that such air currents may not impede the progress of the vehicle by striking against obstructions thereon or cause any inconvenience to persons in the vehicle.

Suitable vanes or planes $e$ may be mounted in convenient positions either horizontally or vertically and at the front or rear of the duct $a$ to provide additional means of steering or braking; the customary steering and braking mechanism however would still be retained.

Having now described my invention what I claim and desire to secure by Letters Patent is:—

1. A motor vehicle body constructed in the form of an open ended tubular duct, having mounted therein motor driven air propellers, substantially as herein described.

2. A motor vehicle body constructed in the form of an open ended tubular duct, provided with seats and having mounted therein motor-driven propellers, substantially as herein described.

3. A motor vehicle body, constructed in the form of an open ended tubular duct of variable contour in cross section throughout its length, but of approximately uniform cross sectional area, substantially as herein described.

4. A motor vehicle body constructed in the form of an open ended tubular duct having an adjustable vane mounted therein, substantially as herein described.

In testimony whereof I have signed my name to this specification.

CHARLES HYLAND.